United States Patent [19]

Akagiri

[11] Patent Number: 5,754,427
[45] Date of Patent: May 19, 1998

[54] DATA RECORDING METHOD

[75] Inventor: Kenzo Akagiri, Kanagawa, Japan

[73] Assignee: Sony Corporation, Tokyo, Japan

[21] Appl. No.: 662,059

[22] Filed: Jun. 12, 1996

[30] Foreign Application Priority Data

Jun. 14, 1995 [JP] Japan .................. 7-147742

[51] Int. Cl.[6] .................................. H03M 7/30
[52] U.S. Cl. .............. 364/400.01; 375/240; 375/242; 375/244; 704/201; 704/204; 704/229
[58] Field of Search .................. 364/514 R, 514 A, 364/400.01; 395/2.13, 2.14, 2.36, 2.38, 2.39; 369/54, 60, 124, 59, 291; 375/240–245, 343; 704/201, 203, 204, 212, 229

[56] References Cited

U.S. PATENT DOCUMENTS

| 4,685,115 | 8/1987 | Akagiri et al. ............... 375/244 |
| 4,974,235 | 11/1990 | Sasaki et al. ............... 375/245 |
| 5,070,515 | 12/1991 | Iwahashi et al. . |
| 5,311,561 | 5/1994 | Akagiri ............... 375/240 |
| 5,388,209 | 2/1995 | Akagiri ............... 704/229 |
| 5,438,643 | 8/1995 | Akagiri et al. ............... 704/201 |
| 5,490,130 | 2/1996 | Akagiri ............... 704/201 |
| 5,491,481 | 2/1996 | Akagiri ............... 704/212 |
| 5,590,108 | 12/1996 | Mitsuno et al. ............... 369/59 |
| 5,608,713 | 3/1997 | Akagiri et al. ............... 704/204 |

*Primary Examiner*—Emanuel Todd Voeltz
*Assistant Examiner*—Bryan Bui
*Attorney, Agent, or Firm*—Limbach & Limbach L.L.P.

[57] ABSTRACT

In a compact disc having a fixed bit rate, the bit rate is rendered substantially variable for improving the sound quality. Each sample is represented by a fixed length of 16 bits. For a sample with a bit surplus K, its data is substantially represented by upper 14 bits. For the lower two bits of the block K are allocated data of lower two bits of data of a bit deficit block L substantially represented by 18 bits.

15 Claims, 16 Drawing Sheets

DATA RECORDING METHOD

BACKGROUND OF THE INVENTION

1. Field of the Invention

This invention relates to a method and apparatus for signal transmission, a method and apparatus for signal reproduction and a method and apparatus for quantization. More particularly, it relates to such methods and apparatus employed with advantage for improving the sound quality while maintaining interchangeability with existing compact discs (trade mark).

2. Description of the Related Art

With a compact disc, straight PCM is used for recording, with a sample word length being 16 bits.

However, a sound source recorded with 20 bits per sample is available, such that recording/reproduction on or from a compact disc with a 20-bit sound quality is desired.

For recording a 20-bit-per-sample sound source with 16 bits, simply 4 bits of the least significant bit (LSB) side of the 20-bit sound source are truncated.

Alternatively, the technique of super bit mapping (SBM), also trade mark, as proposed by the present inventors in the U.S. Pat. No. 5,070,515, may be used for optimizing the acoustically perceived quantization noise level.

However, if the four LSB side bits of the 20-bit sound source are simply truncated, the quantization noise is increased in a sample exceeding 20 dB, thus unavoidably deteriorating the sound quality.

By employing the SBM technique, the acoustically optimized quantization noise at 16 bits can be obtained. This, however, is not satisfactory in case masking is insufficient because the quantization noise by fixed word length quantization is set even although the quantization noise spectrum is irrespective of or dependent on the signal contents.

For maintaining the sound quality of the 20-bit sound source itself, it is desired to lower the quantization noise further.

In addition, compact disc players, now on the market, are also required to be interchangeable so that the 20-bit sound source will be reproduced with the same sound quality as the 16-bit quantized signals. There is also a demand that the recording time be not reduced significantly as compared to the usual compact disc.

SUMMARY OF THE INVENTION

It is therefore an object of the present invention to enable digital signals of a 20-bit sound source to be recorded on or reproduced from a recording while maintaining interchangeability with conventional products for the 16-bit sound source.

With the signal transmission method according to the present invention, a signal of a time sample of a different time region or a time sample of a different channel also having the precision-improving information is arrayed on the LSB side of the time sample and the resulting signal is transmitted.

With the signal transmission method according to the present invention, the acoustically inaudible signal level is detected, and the information of a signal portion in which an acoustically inaudible signal level is lower than the transmission feasible level is arrayed in a signal portion in which an acoustically inaudible signal level is higher than the transmission feasible level and the resulting signal is transmitted.

With the signal transmission method according to the present invention, the address information of a signal portion in which an acoustically inaudible signal level is higher than the transmission feasible level and the address information of a signal portion in which an acoustically inaudible signal level is lower than the transmission feasible level are recorded and transmitted in a subcode of a compact disc.

With the signal transmission method according to the present invention, there is arrayed in an acoustically inaudible LSB side portion of the straight PCM codes at least one acoustically audible LSB side portion of a different time zone or a different channel having a level lower than the transmission feasible level of the straight PCM codes and the resulting signal is transmitted.

The PCM codes of the different time zone are compressed PCM codes.

DESCRIPTION OF THE PREFERRED EMBODIMENTS

Figure 1:
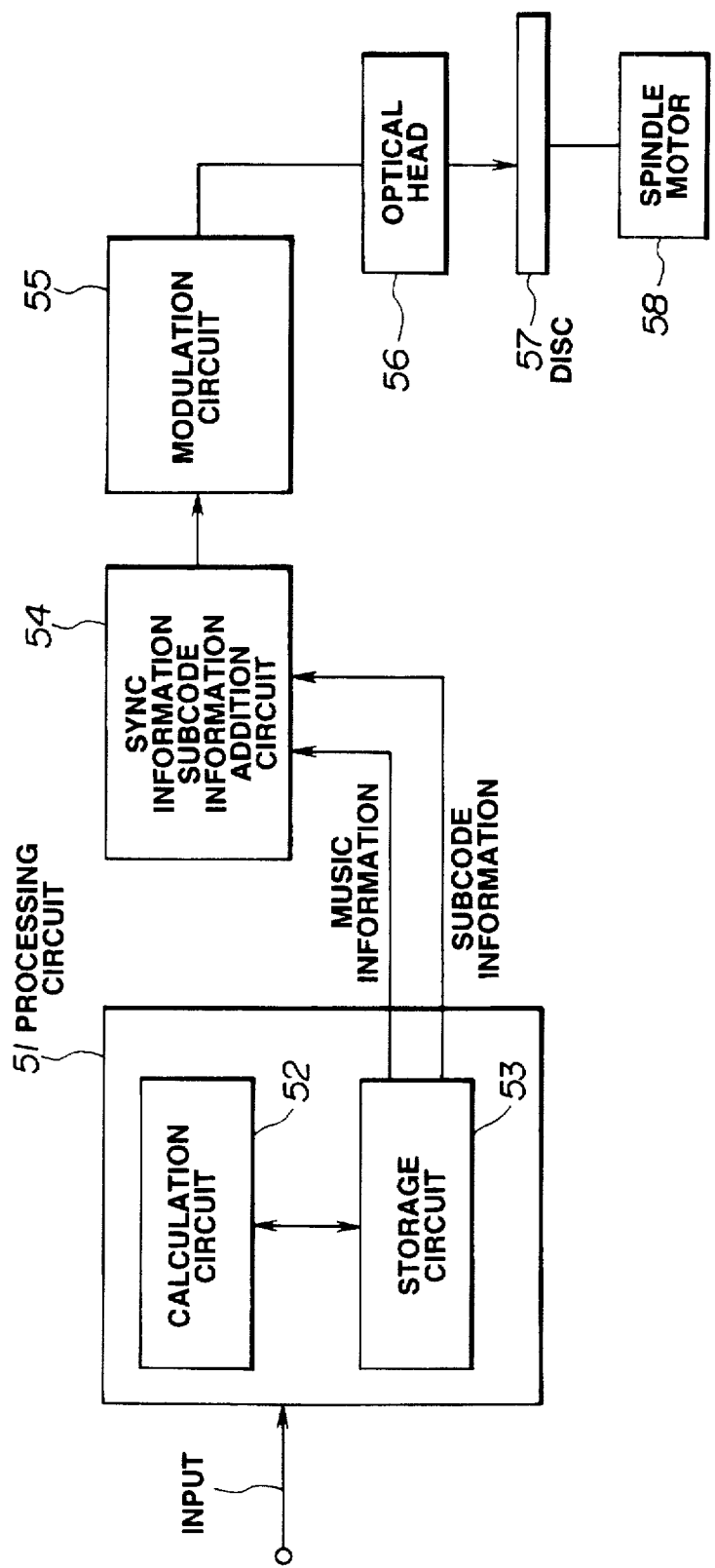
FIG. 1 is a block diagram showing an illustrative structure of an encoding device according to the present invention.

FIG. 1 shows an illustrative structure of an encoder device according to the present invention.

In the present embodiment, digital speech signals to be recorded are supplied to a processing circuit 51 made up of a calculation circuit 52 and a storage circuit 53. The storage circuit 53 stores input speech data, while the calculation circuit 52 executes pre-set calculations on the speech data stored therein.

The speech data (music information) processed in a pre-set manner and the subcode information are supplied to a synchronization information and subcode information addition circuit 54. The synchronization information and subcode information addition circuit 54 is supplied to a modulation circuit 55 where it is modulated by EFM and thence supplied to an optical head 56 so as to be recorded on a disc 57. A spindle motor 58 runs the disc 57 at a pre-set speed.

The operation of the encoder device is now explained. When speech data is supplied to the processing circuit 51, the encoder device executes the processing of the first pass shown in FIG. 2 and then executes the processing of the second pass shown in FIG. 3.

In the processing of the first pass, the calculation circuit 52 divides input speech data into blocks and calculates the allowable noise level on the block basis. That is, the input speech data is formed into data of time units of pre-set size. For example, 1024-sample-per-channel data is set as one-block data and the following processing is executed on the block basis.

Figure 4:
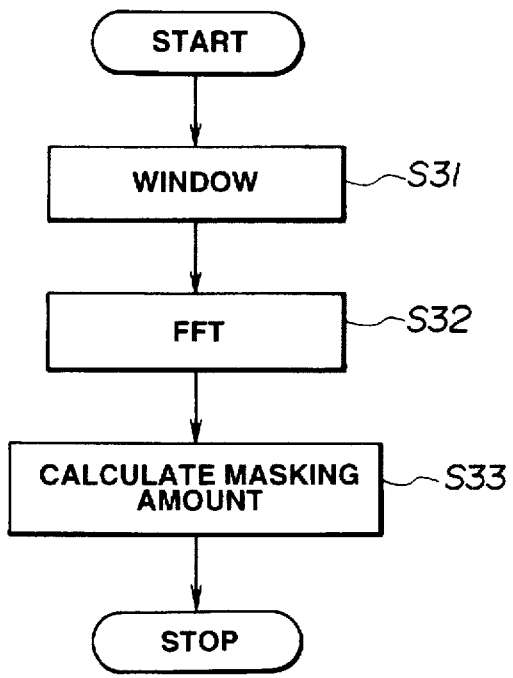
FIG. 4 is a flowchart for illustrating processing at a step S1 of FIG. 2.

The processing shown by the flowchart of FIG. 4 is then carried out. That is, each sample group is divided at step S31 into 256-point time blocks and the multiplied by a window having a width of 512 points. Processing then transfers to step S32 where data selected by the window is processed with orthogonal transform, such as fast Fourier transform (FFT).

The frequency-domain spectral data, obtained by FFT processing, is grouped by so-called critical bands. These critical bands are frequency bands split for taking into account the psychoacoustic characteristics of the human hearing mechanism. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 20 kHz can be divided into, for example, 25 critical bands, as shown in Table 1.

TABLE 1

| band number (Bark) | center frequency (Hz) | bandwidth (Hz) |
| --- | --- | --- |
| 1 | 50 | 80 |
| 2 | 150 | 100 |
| 3 | 250 | 100 |
| 4 | 350 | 100 |
| 5 | 450 | 110 |
| 6 | 570 | 120 |
| 7 | 700 | 140 |
| 8 | 840 | 150 |
| 9 | 1000 | 160 |
| 10 | 1170 | 190 |
| 11 | 1370 | 210 |
| 12 | 1600 | 240 |
| 13 | 1850 | 280 |
| 14 | 2150 | 320 |
| 15 | 2500 | 380 |
| 16 | 2900 | 450 |
| 17 | 3400 | 550 |

TABLE 1-continued

| band number (Bark) | center frequency (Hz) | bandwidth (Hz) |
| --- | --- | --- |
| 18 | 4000 | 700 |
| 19 | 4800 | 900 |
| 20 | 5800 | 1100 |
| 21 | 7000 | 1300 |
| 22 | 8500 | 1800 |
| 23 | 10500 | 2500 |
| 24 | 13500 | 3500 |
| 25 | | |

At step S33, the amount of the allowable noise for each critical band, taking into account the so-called psychoacoustic masking effect, is found based on spectral data split on the critical band basis. For carrying out this processing, the processing circuit 51 substantially has enclosed therein an allowable noise calculation unit 20 shown in FIG. 5. In actuality, the function of this circuit is realized by programmed software processing.

Figure 5:
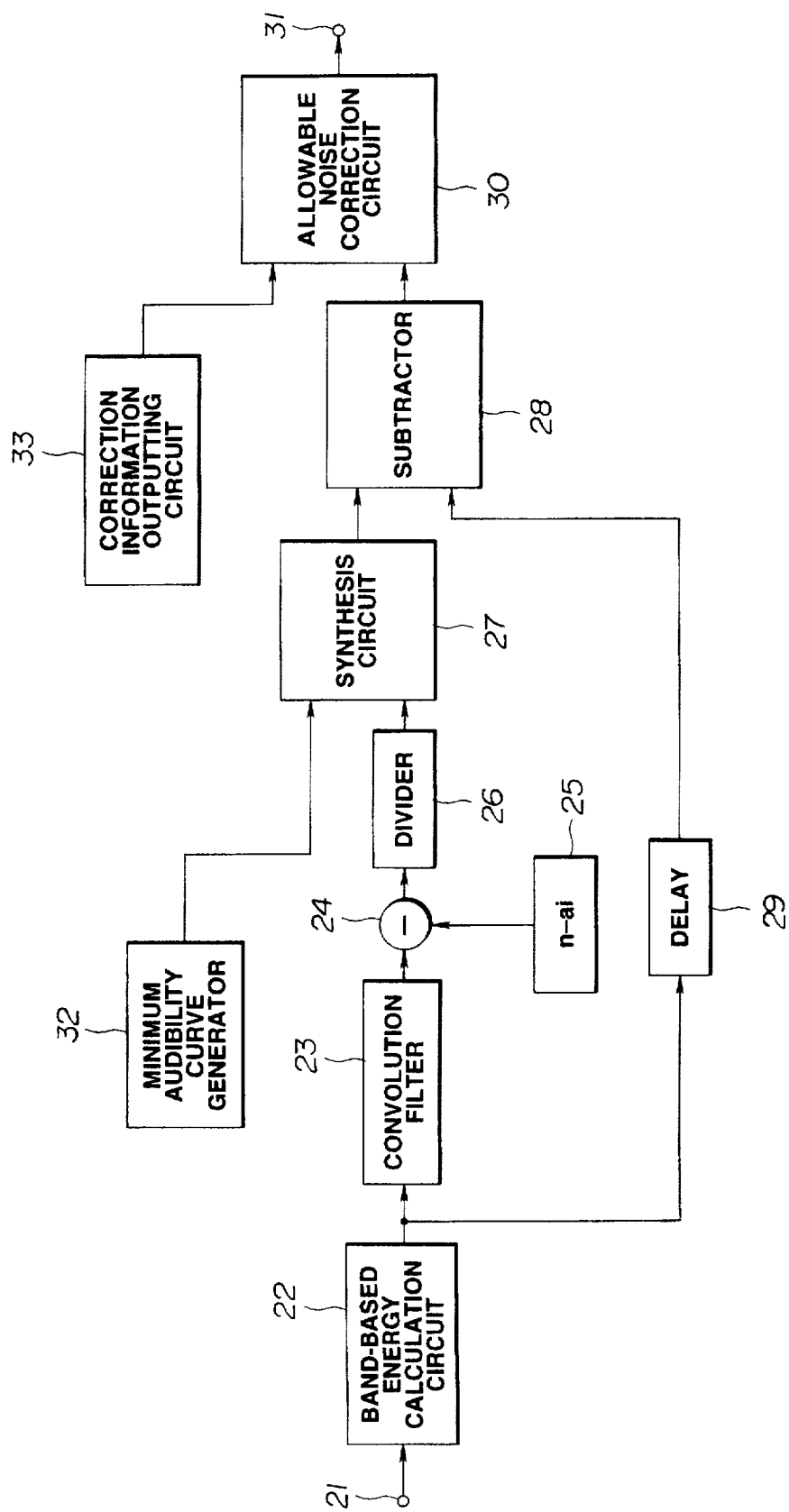
FIG. 5 is a block diagram for illustrating an equivalent structure of the inside of a processing circuit 51 of the embodiment shown in FIG. 1.

Referring to FIG. 5, frequency-domain spectral data, obtained on FFT, is supplied to an input terminal 21.

Figure 6:
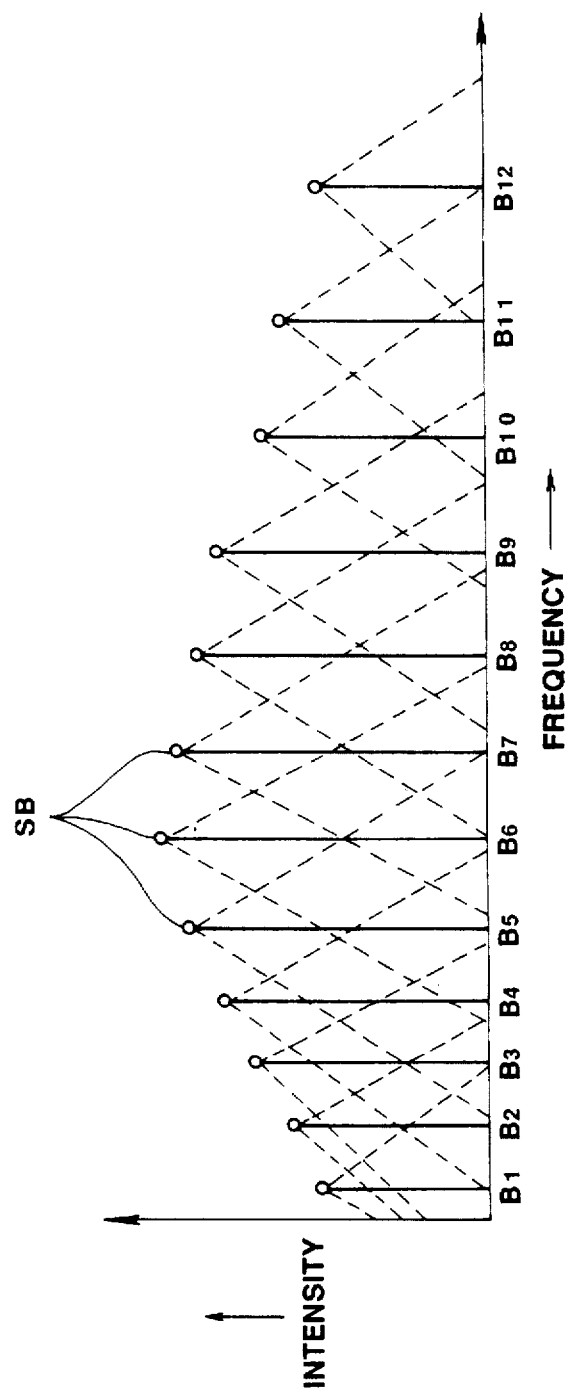
FIG. 6 is a graph for illustrating the processing of an embodiment of FIG. 5.
Figure 7:
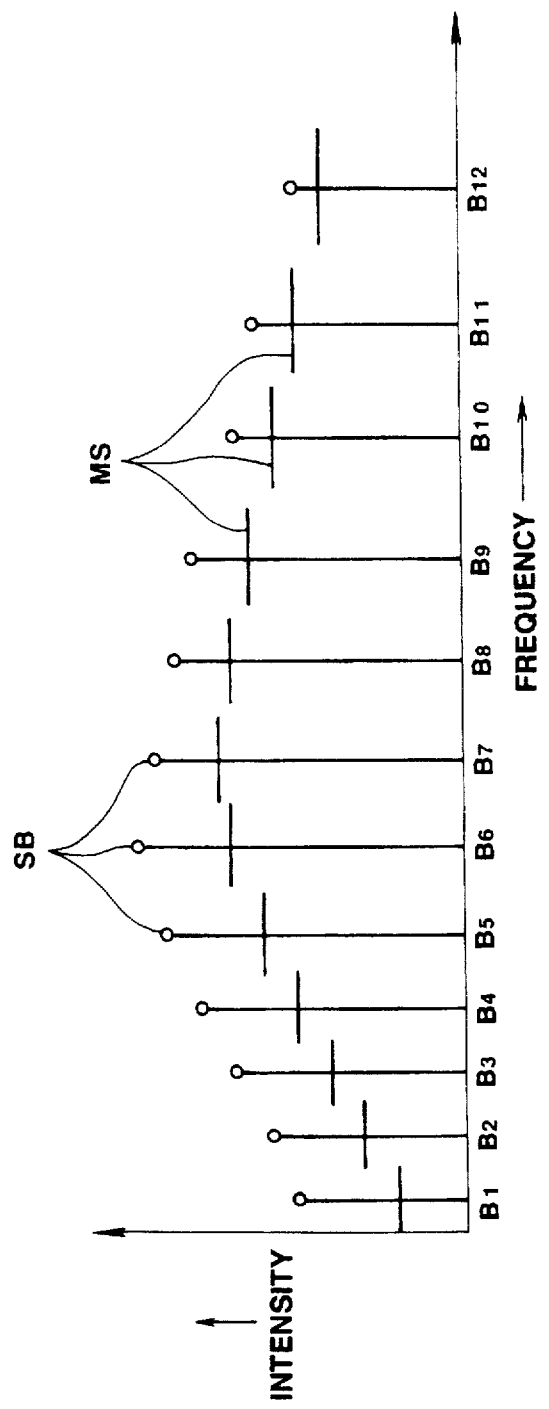
FIG. 7 is another graph for illustrating the processing of the embodiment of FIG. 5.

The frequency-domain spectral data is transmitted to a band-based energy calculating circuit 22 in which the energies of the critical bands are found by calculating the sum total of the amplitudes of the spectral components in the respective bands. The amplitude peak values or mean values may also be employed in place of signal energy in the respective bands. Each spectral component indicating the sum value of each of the respective bands as an output of the energy calculating circuit 22 is termed the Bark spectrum. In FIG. 6, 12 bands B1 to B12 are shown as indicating the critical bands for simplifying the drawing.

It is noted that an operation of multiplying each spectral component SB by a pre-set weighting function for taking into account the effects of masking is performed by way of convolution. To this end, an output of the band-based energy calculating circuit 22, that is each value of the spectral component SB, is transmitted to a convolution filter circuit 23.

The convolution filter circuit 23 is made up of a plurality of delay elements for sequentially delaying input data, a plurality of multipliers, such as 25 multipliers associated with the respective bands, for multiplying outputs of the delay elements with filter coefficients or weighting functions, and an adder for calculating the sum of the outputs of the respective multipliers. By such convolution, the sum of the portions indicated by broken lines in FIG. 6 is found.

The masking means the phenomenon in which certain signals are masked by other signals and become inaudible due to psychoacoustic characteristics of the human aural sense. The masking effect may be classified into the time-domain masking effect produced by the time-domain audio signals and concurrent masking effect produced by the frequency-domain signals. By this masking, any noise present in a masked portion becomes inaudible.

Thus, in actual audio signals, the noise within the masked range is an allowable noise. According to the present invention, since data within this masked range cannot be perceived, valid data other than inherent data is written therein in place of the inherent data.

By way of an illustrative example of multiplication coefficients or filter coefficients of the respective filters of the convolution filter circuit 23, if the coefficient of a multiplier M for an arbitrary band is 1, outputs of the delay elements are multiplied by coefficients 0.15, 0.0019, 0.0000086, 0.4, 0.06 and 0.007 at the multipliers M−1, M−2, M−3, M+1, M+2 and M+3, M being an arbitrary integer of from 1 to 25, for performing convolution of the spectral components SB.

An output of the convolution filter circuit 23 is transmitted to a subtractor 24 which is employed for finding a level α corresponding to the allowable noise level in the convolved region. Meanwhile, the allowable noise level α is such a level which will give an allowable noise level for each of the critical bands by deconvolution by a divider 26 as will be described subsequently. The subtractor 24 is supplied from a function generator 25 with an allowance function (a function representative of the masking level) for finding the level α. The level α is controlled by increasing or decreasing the allowance function. The allowance function is supplied from a (N−ai) function generator 25 as will be explained subsequently.

That is, the level α corresponding to the allowable noise level is found from the equation (1):

$$\alpha = S - (n - ai) \quad (1)$$

where i is the number accorded sequentially to the critical bands beginning from the lower side, n and a are constants where a>0 and S the intensity of the convolved Bark spectrum. In the equation (1), (n−ai) represents the allowance function. In the present embodiment, n=38 and a=1.

The level α is found in this manner and transmitted to the divider 26 configured for deconvolving the level α in the convolved region. By this deconvolution, the masking threshold is found from the level α. This masking spectrum becomes the allowable noise level. Although the deconvolution necessitates complex arithmetic-logical steps, it is simplified in the present embodiment by employing the divider 26.

The masking spectrum is transmitted via a synthesizing circuit 27 to a subtractor 28 which is supplied with an output of the band-based energy detection circuit 22, that is the above-mentioned Bark spectral components SB. The subtractor 28 subtracts the masking spectrum from the spectrum SB for masking the portions of the Bark spectral components SB lower than the level of the acoustic masking level MS.

An output of the subtractor 28 is taken out at an output terminal 31 via an allowable noise correction circuit 30.

The delay circuit 29 is provided for delaying the Bark spectral components SB from the energy calculation circuit 22 taking into account the delay produced in the circuitry upstream of the synthesis circuit 27.

Figure 8:
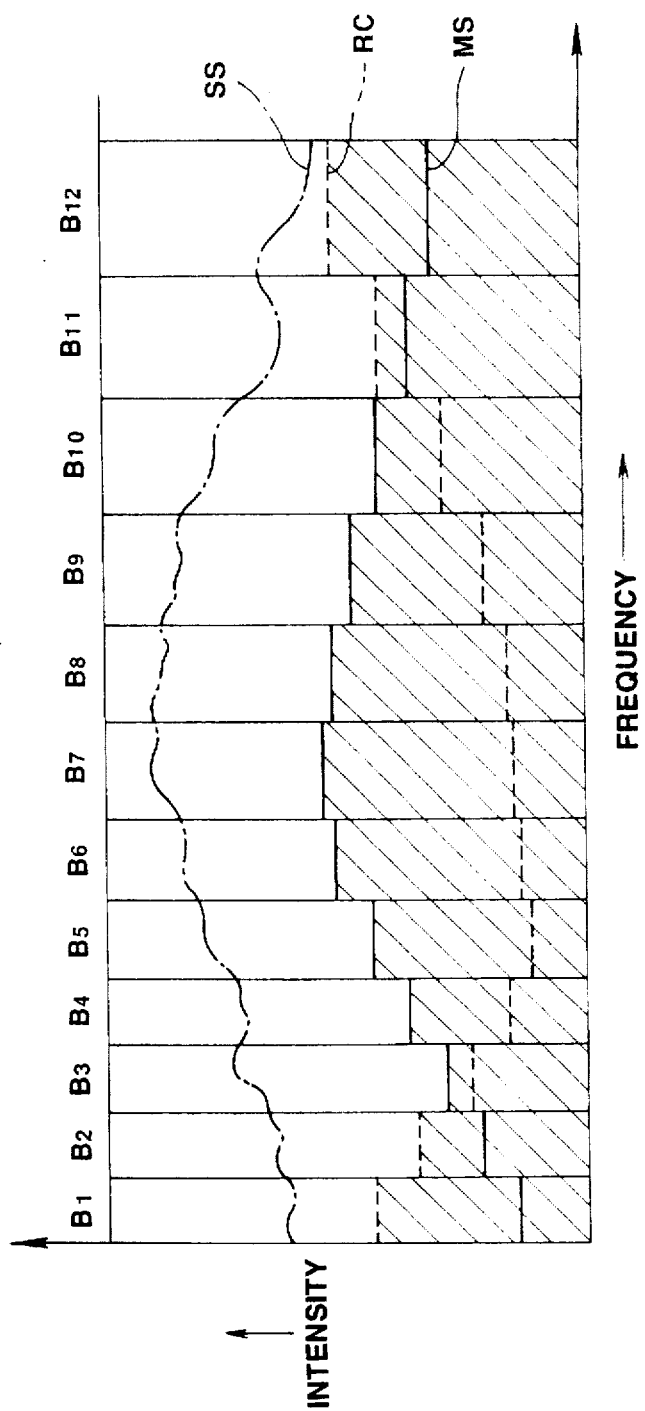
FIG. 8 is still another graph for illustrating the processing of the embodiment of FIG. 5.

The synthesizing circuit 27 may also be designed to synthesize the acoustic masking level MS and data from the minimum audibility curve RC from the minimum audibility curve generating circuit 32 representing psychoacoustic characteristics of the human aural sense as shown in FIG. 8. If the absolute noise level is lower than the minimum audibility curve RC, the noise becomes inaudible.

The minimum audibility curve differs with the difference in, for example, the adjustment of the playback volume at the time of reproduction. However, in an actual digital-audio system, data of each music air is quantized so that, if the dynamic range is 18 bits, the entire range of 18 bits will be exploited. Therefore, if the quantization noise of the frequency range in the vicinity of 4 kHz most perceptible to the ear is not heard, the quantization noise lower than the level of the minimum audibility curve is not heard in any other frequency range.

Thus, if the recording/reproducing device is employed so that the noise in the vicinity of 4 kHz is not heard, and the allowable noise level is to be obtained by synthesizing the minimum audibility curve RC and the acoustic masking level MS, the allowable noise level may be up to the level indicated by hatched lines in FIG. 8. In FIG. 8, the signal spectrum SS is also shown.

Figure 9:
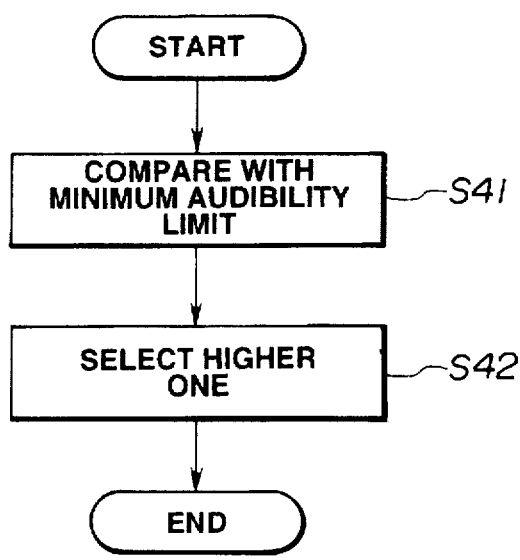
FIG. 9 is a flowchart for illustrating the operation of the embodiment of FIG. 5.

Thus the synthesis circuit 27 executes processing shown by a flowchart shown in FIG. 9. That is, the acoustically perceived masking level MS, entered from the divider 26, is compared at step S41 to the level of a minimum audibility curve RC entered from the minimum audibility curve generating circuit 32. The acoustically perceived masking level MS or the level of the minimum audibility curve RC, whichever is higher, is selected at step S42 and outputted to the subtractor 28.

Besides, the allowable noise correction circuit 30 corrects the allowable noise level in the output of the subtractor 28 based on the information of the equal-loudness curve transmitted from a correction information outputting circuit 33. The equal-loudness curve is a characteristic curve concerning psychoacoustic characteristics of human aural sense, and is obtained by finding the sound pressures of the sound at the respective frequencies heard with the same loudness as the pure tone of 1 kHz and by connecting the sound pressures by a curve. It is also known as an equal loudness sensitivity curve. The equal-loudness curve also delineates a curve which is substantially the same as the minimum audibility curve shown in FIG. 8.

With the equal-loudness curve, the sound in the vicinity of 4 kHz is heard with the same loudness as the sound of 1 kHz, even although the sound pressure is decreased by 8 to 10 dB from the sound of 1 kHz. Conversely, the sound in the vicinity of 10 kHz cannot be heard with the same loudness as the sound of 1 kHz unless the sound pressure is higher by about 15 dB than that of the sound of 1 kHz. Thus it may be seen that, in the allowable noise correction circuit 30, the allowable noise level preferably has frequency characteristics represented by a curve conforming to the equal-loudness curve. Thus it may be seen that correction of the allowable noise level in consideration of the equal-loudness curve is in conformity to psychoacoustic characteristics of the human aural sense.

If the equal loudness curve used at this time corresponds to a sine wave, a loudness curve for the noise may be obtained on normalization with a critical bandwidth. Instead of a single loudness curve, an intermediate curve between a curve having flat characteristics and the loudness curve may also be selected.

Returning to FIG. 2, if the allowable noise level is obtained at step S1 as described above, processing transfers to step S2 where the quantization noise spectral level is found by SBM processing of data. It is then found which of the quantization noise spectral level or the allowable noise level obtained at step S1 is larger.

Figure 10:
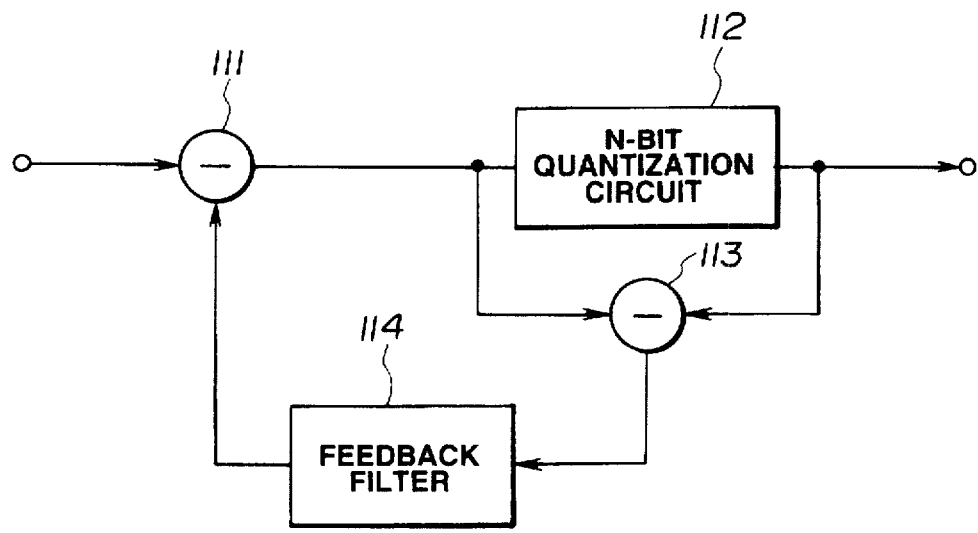
FIG. 10 is a block diagram showing an illustrative construction of a circuit for doing N-bit SBM quantization at step S2 of FIG. 2.

FIG. 10 shows an illustrative structure of a circuit designed to execute SBM processing. This circuit is also substantially enclosed within the processing circuit 51 shown in FIG. 1.

Specifically, a quantization input word enters a first subtractor 111 where a difference between the input word and an output of a feedback filter 114 is calculated. An output of the first subtractor 111 enters an N-bit quantization circuit 112 where it is quantized into N bits.

A second subtractor 113 finds a difference between the output of the first subtracter 111 (an input to the N-bit quantization circuit 112) and an output of the N-bit quantization circuit 112, that is a so-called quantization error, and outputs the results of calculation to the feedback filter 114. The feedback filter 114 corrects frequency characteristics of input data so that the corrected frequency characteristics will become characteristics corresponding to, for example, equal loudness characteristics, and outputs the corrected frequency characteristics to the first subtractor 111.

The first subtractor 111 thus subtracts input data from the feedback filter 114 from the quantization input word and outputs difference data which is then processed as described above.

The result is that N-bit data is obtained in which the quantization noise is processed so as to have characteristics corresponding to the equal loudness curve by noise shaping.

Since the above-described SBM processing is described in detail in the above-referenced U.S. Pat. No. 5,070,515, it is not described in detail herein.

Figure 2:
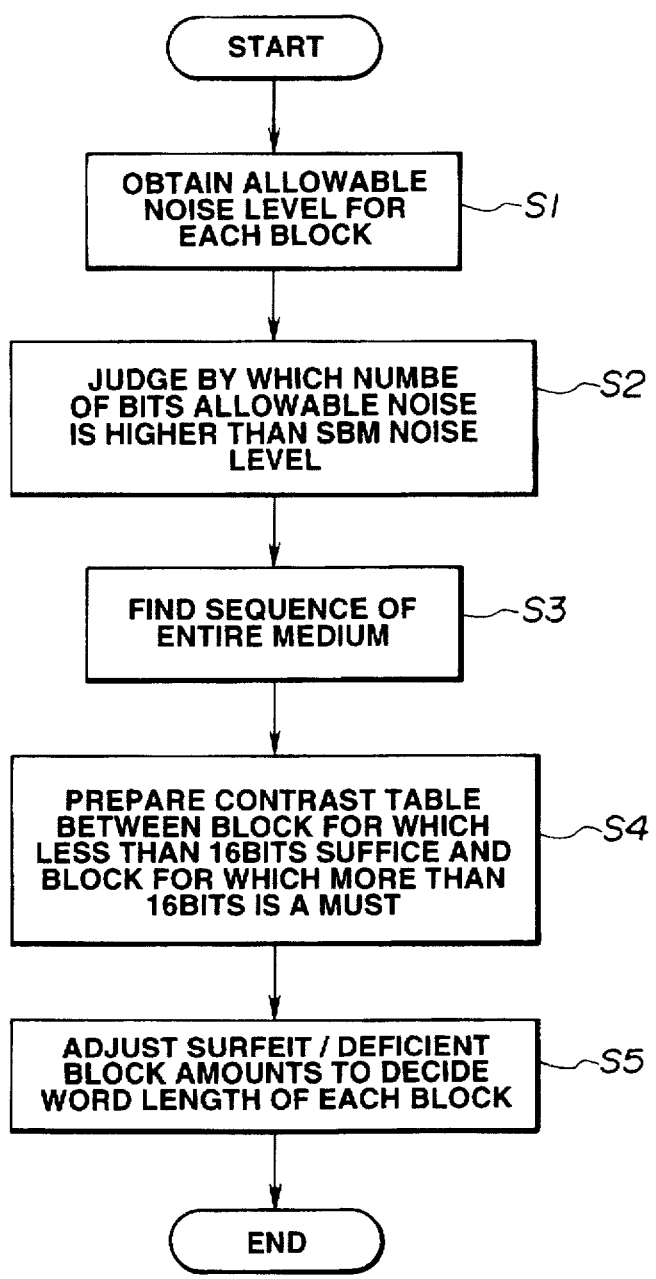
FIG. 2 is a flowchart for illustrating processing of the first pass in the embodiment of FIG. 1.

The SBM noise level, obtained as described above, is compared at step S2 to the allowable noise level obtained at step S1 of FIG. 2. Plural values of the SBM noise levels are obtained by changing the characteristics of the feedback filter 114 of FIG. 10. Also, the values of N are changed to 14, 16 and 18 bits for obtaining the corresponding values of the SBM noise (curves A to F in FIG. 11).

Figure 11:
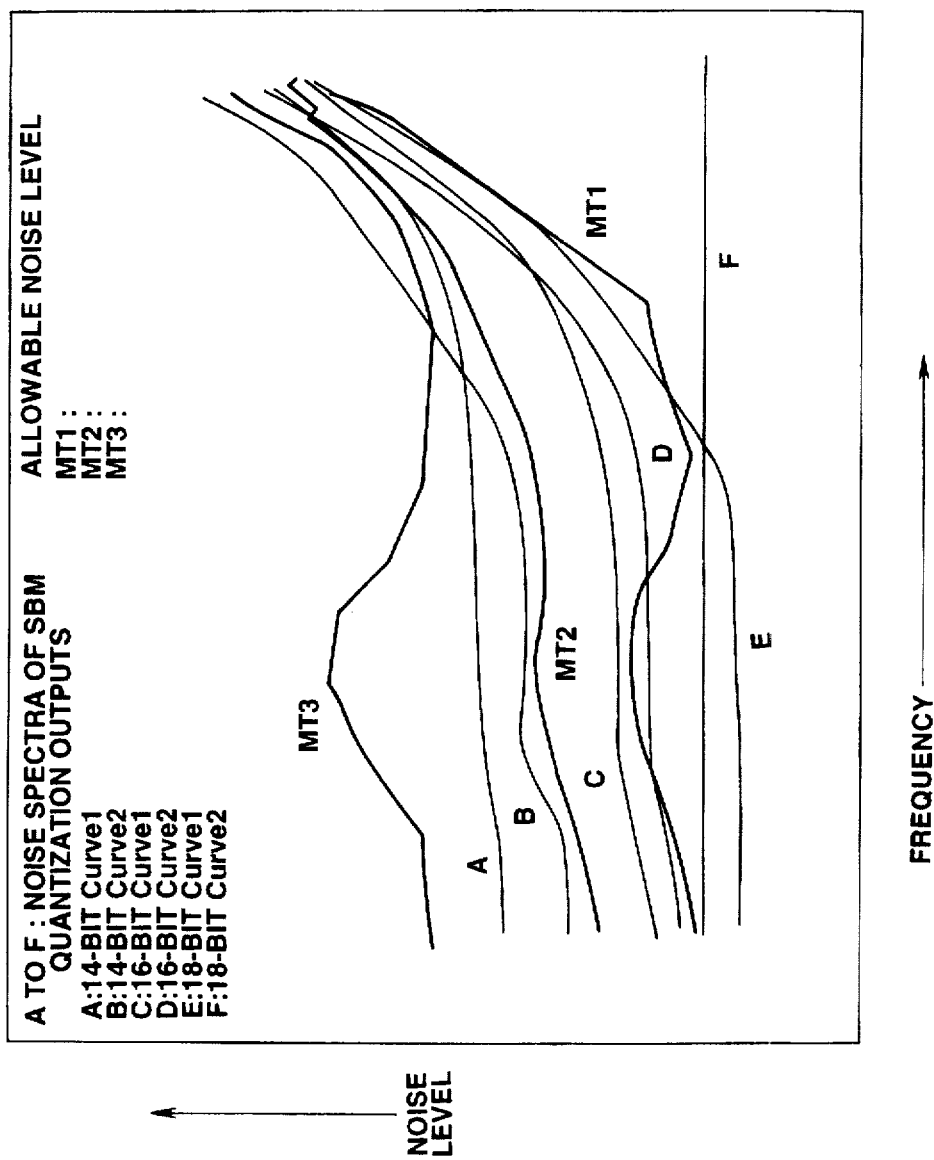
FIG. 11 is a graph showing the allowable noise level and the SBM quantization noise level.

Referring to FIG. 11, comparison between the SBM noise level and the allowable noise level is explained.

If the acoustic masking level (allowable noise level) obtained at step S1 of FIG. 2, such as MT2 of FIG. 11, is higher in the entire frequency spectrum than the quantization noise spectrum level realized by any 16-bit SBM processing, herein a curve D, the time block signal is not in need of 16 bits. Conversely, if the obtained allowable noise level, such as MT1, is lower in any range of the entire frequency spectrum than the quantization noise spectral level realized by each 16-bit SBM processing (curves C and D), it is necessary to set the word length so as to be longer than 16 bits.

In this manner, the quantization noise spectral level realized by 16-bit SBM processing and the block-based acoustic masking level (allowable noise level) are compared to each other. In addition, bit lengths of bit surplus or bit deficit are calculated by the processing circuit 51 at step S3 of FIG. 2 for the entire blocks (entire blocks of the music information to be recorded).

At step S4, a contrast table of addresses of blocks where less than 16 bits suffice and addresses of blocks where longer than 16 bits are required is prepared. At step S5, surplus bits and deficient bits are adjusted as to bit lengths for determining word lengths of the respective blocks.

The following description is made only with reference to the surplus and deficient bit lengths of 2 bits for simplicity. However, the bit length may also be generalized to N bits.

Figure 12:
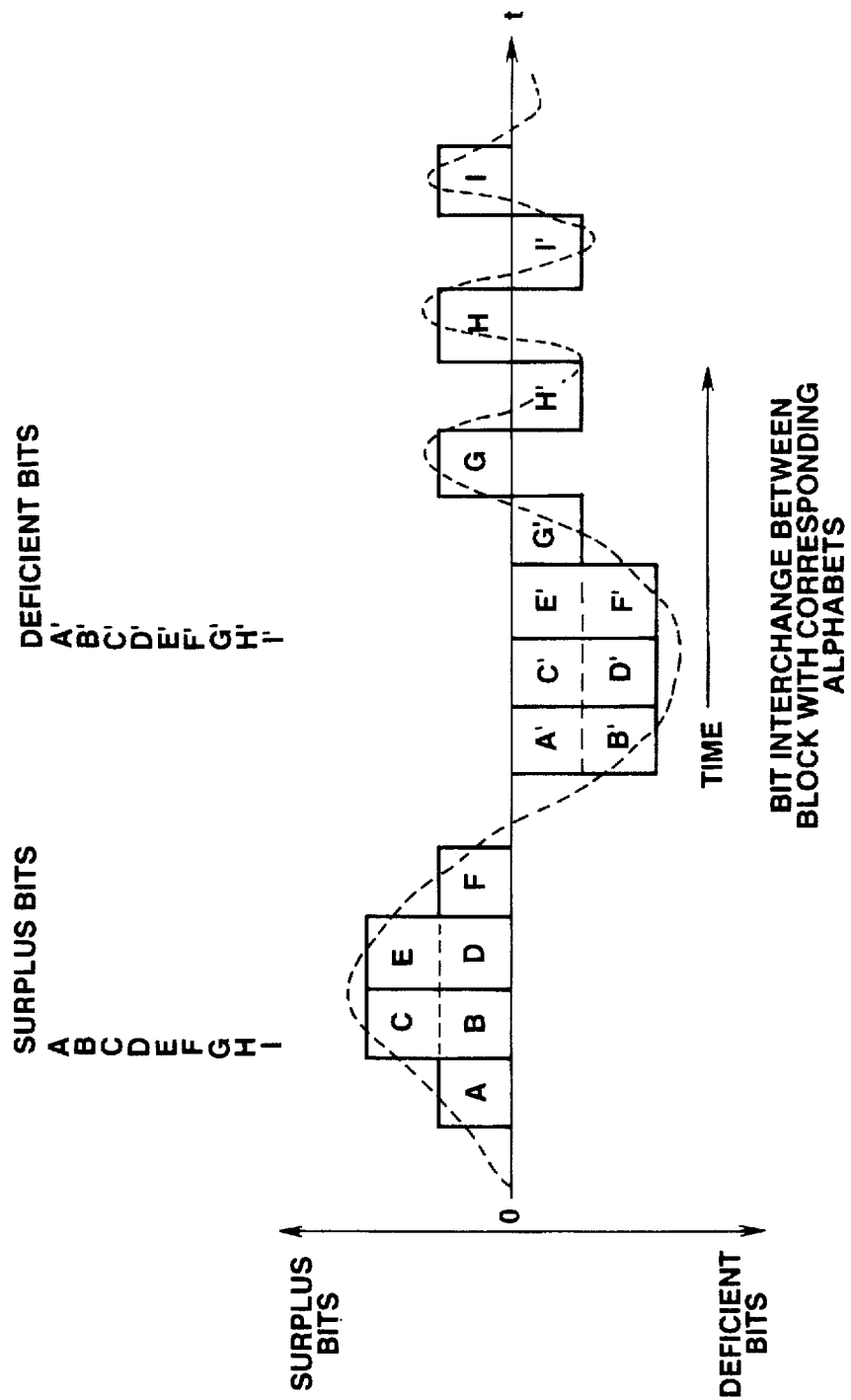
FIG. 12 illustrates bit exchange between blocks.

FIG. 12 shows the state of surplus data and deficit data. In this figure, the word length is fixed at 16 bits as in the case of a compact disc. The level denoted as 0 in FIG. 12 is the minimum possible transmission level, while a line denoted by a broken line denotes a masking level. A to I denote surplus bits in case quantization is done with 16 bits while A' to I' denote deficient bits in case quantization is done with 16 bits. If the surplus or deficient bit length is 2 bits, the quantization noise spectra level realized by SBM processing in 14 bits or 16 bits is compared to the acoustic masking level (allowable noise level). If the allowable noise level is higher in the entire frequency spectrum than the quantization noise spectral level realized by 14-bit SBM processing, the block is regarded as being processible with 14-bit SBM.

Conversely, if the allowable auditory noise level is higher in the entire frequency spectrum than the quantization noise spectrum realized by 16-bit SBM processing in at least one area, the block is regarded as being in need of 18-bit SBM processing. In other cases, bit surplus or bit deficit is judged not to exist.

The above-described processing is carried out for data from the beginning to the end of the first music air. This is called processing of the first pass. The processing of the first pass produces the information indicating whether the bit length is surplus or in deficit and the address information indicating which block is in such state.

Figure 3:
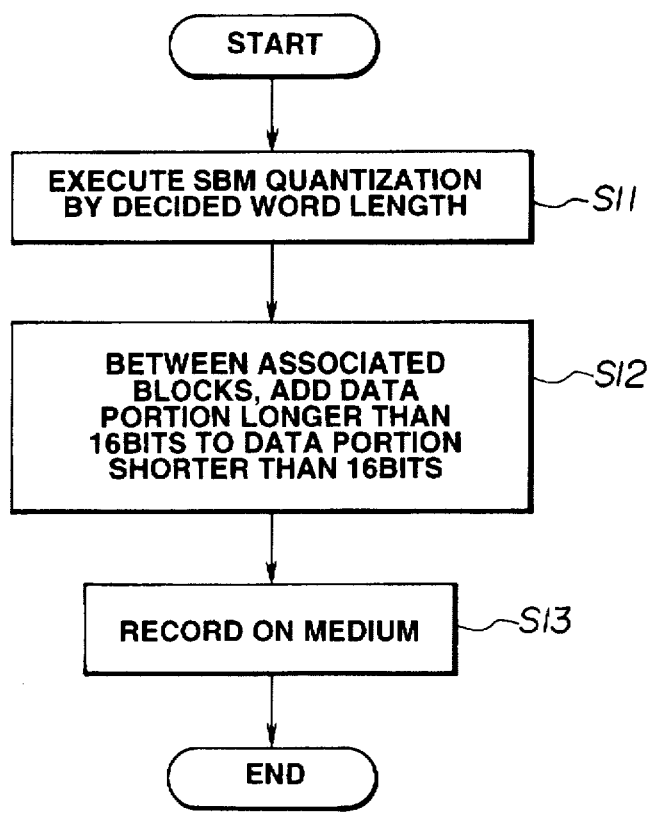
FIG. 3 is a flowchart for illustrating processing of the second pass in the embodiment of FIG. 1.

The processing of the second pass shown in FIG. 3 is executed. First, at step S11, the SBM quantization processing with the word length determined at a step S5 of FIG. 2 is executed. The block having a short bit length not reaching 16 bits is termed a block having surplus bit length, or a bit-surplus block. Conversely, the block having a long bit length exceeding 16 bits is termed a block having a deficient bit length, that is a bit deficit block.

At step S12, the bit surplus block and the bit deficit block are identified and the bit deficit block is associated with the bit surplus block for according bits to the bit deficit block for information writing.

That is, the compact disc player according to the present invention is in need of a function of reading out the information at a speed several times faster than the real time. Such function is not particular and is employed in, for example, a portable player. That is, in the portable player, there are occasions wherein tracking cannot be made continuously due to external shock or vibrations. Thus the portable player is configured for reading out the information at a speed several times faster than the real time for transient storage in the memory. Data is read out from the memory on the real time basis for assuring shock-proofness.

The processing circuit 51 appends the information contained in the code portion having the posterior playback timing to a code portion having a previous playback timing in the realtime playback system for improving precision of the code portion having the previous playback timing in the realtime playback system.

Figure 13:
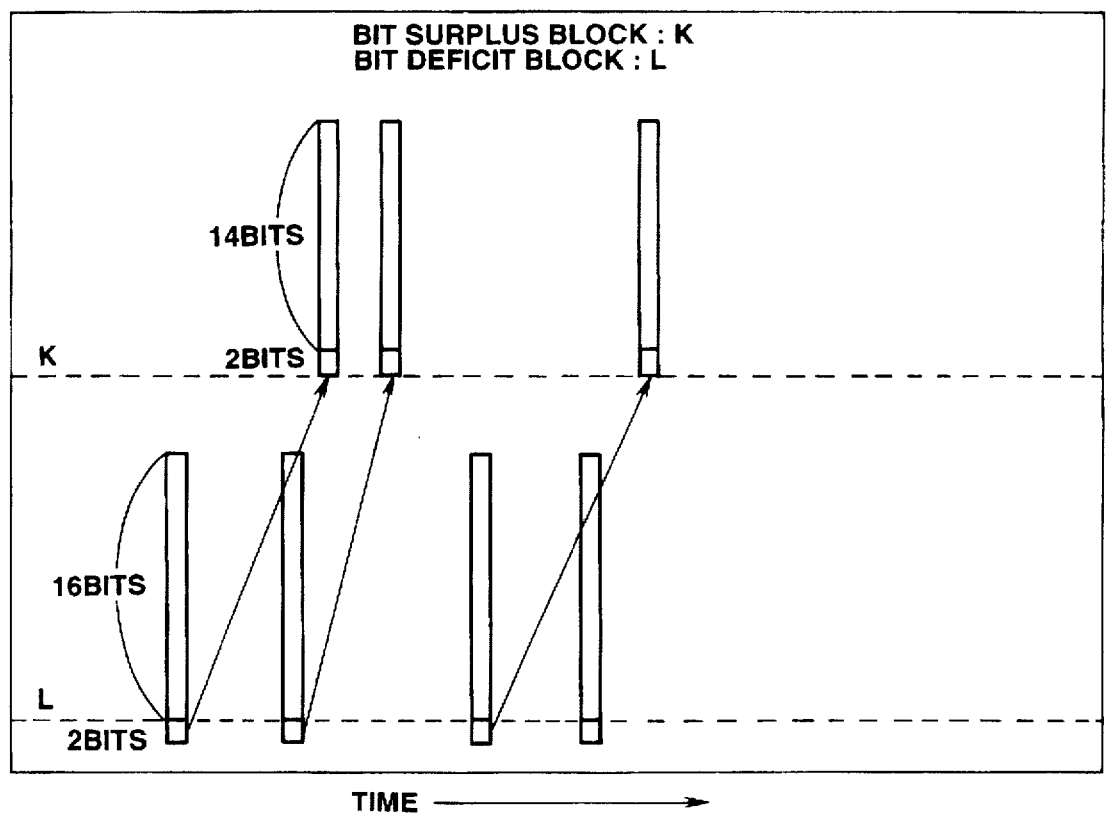
FIG. 13 illustrates data exchange between bit surplus blocks and bit deficit blocks.

The processing circuit 51 analyses a signal of a duration of, for example, five minutes. The processing circuit decides that, if there exist a temporally previous bit deficit block L and a temporally posterior bit surplus block K, as shown in FIG. 13, bit debit/bit credit be performed between these two blocks. At this time, the information corresponding to the 17th and 18th bits from the MSB of the temporally previous bit deficit block L is written in two LSB side surplus bits of the temporally posterior bit surplus block K.

Figure 14:
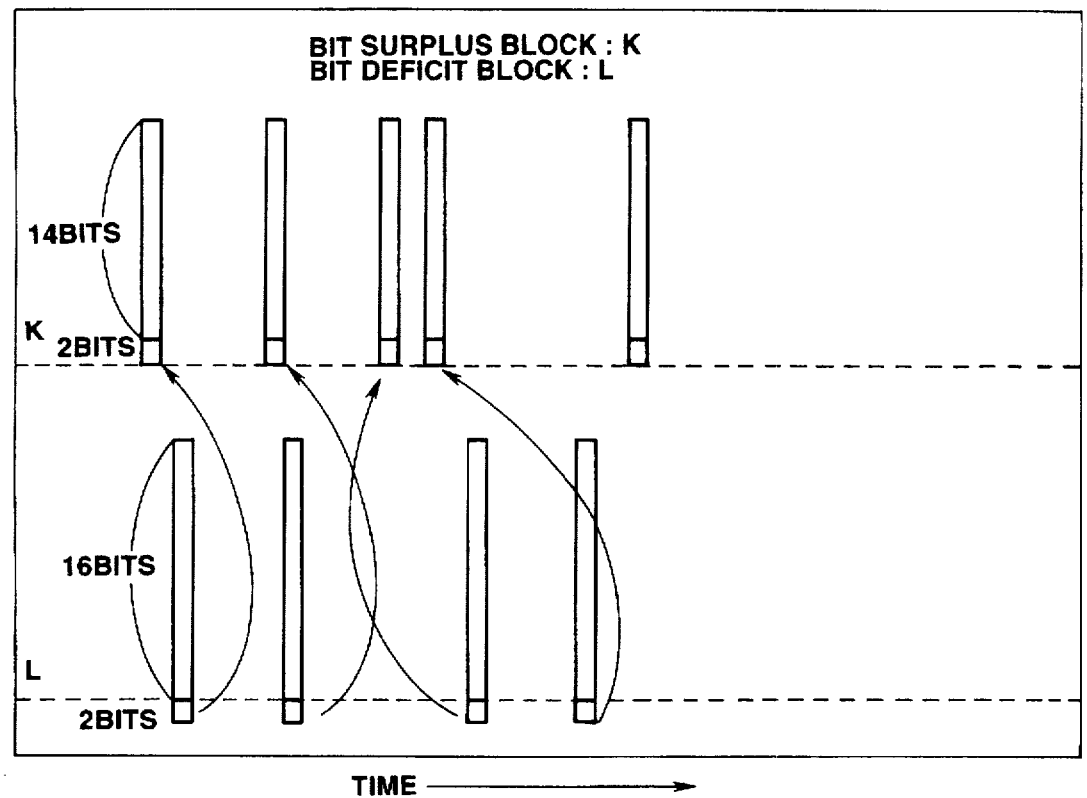
FIG. 14 is a view similar to FIG. 12 for illustrating data exchange between bit surplus blocks and bit deficit blocks.

The same holds for the case opposite to that shown in FIG. 13, that is the case shown in FIG. 14 in which the temporal relation between the bit surplus block K and the bit deficit block L is reversed from that shown in FIG. 13. However, in this case, the read-out speed from the recording medium (compact disc) is not related with the maximum allowable value of the temporal distance between the bit surplus block K and the bit deficit block L and depends on the amount of the address information of the subcode in which to write the addresses indicating sites of the bit surplus block K and the bit deficit block L and the capacity of the memory in which to write the 17th and 18th bits from the MSB of the bit deficit block L.

If the bit deficit block L is present temporally posteriorly and the bit surplus block K is present temporally previously, the processing circuit 51 causes bit debit/bit credit to occur between these two blocks. At this time, the 17th and 18th bits of the MSB side of the temporally posteriorly reproduced bit deficit block L are written at two LSB side bits of the temporally previous bit surplus block K.

The scheduling of the bit debit/bit credit between the bit deficit block L and the bit surplus block K, that is which bit deficit block and bit surplus block should have the bit debit/bit credit relation with each other, is largely optional. The approximate guideline is as follows:

It is assumed that the bit deficit blocks and the bit surplus blocks for a one-hour sequence have all been detected.

If the number of the bit deficit blocks is less than that of the bit surplus blocks, decision is made as to writing the additional information in a temporally future playback information portion which becomes possible by high-speed writing exceeding the real time. This operation is carried out in case the writing of the additional information in the temporally past playback information portion is impossible by timing relation between the bit surplus and bit deficit blocks. If no bit surplus block is found in an additional information write enable time zone to the temporally future playback information portion which becomes possible by high-speed readout exceeding the real time, this process is abandoned.

As for the remaining bit deficit blocks and bit surplus blocks, the relation of one-for-one correspondence is set beginning from the temporally past blocks.

If the number of the bit deficit blocks is larger than that of the bit surplus blocks, decision is made as to writing the additional information in a temporally future playback information portion which becomes possible by high-speed writing exceeding the real time. This operation is carried out in case the writing of the additional information in the temporally past playback information portion is impossible. If no bit surplus block is found in an additional information write enable time zone to the temporally future playback information portion which becomes possible by high-speed readout exceeding the real time, this process is abandoned. The process comes to an end at a time point when the available bit surplus blocks have become depleted.

As for the remaining bit deficit blocks and bit surplus blocks, the relation of one-for-one correspondence is set beginning from the temporally past blocks. This process comes to a close at a time point when the usable bit surplus blocks have become depleted.

When the processing at step S12 of FIG. 3 has come to a close as described above, the processing transfers to step S13 in order to execute recording on the recording medium.

Figure 16:
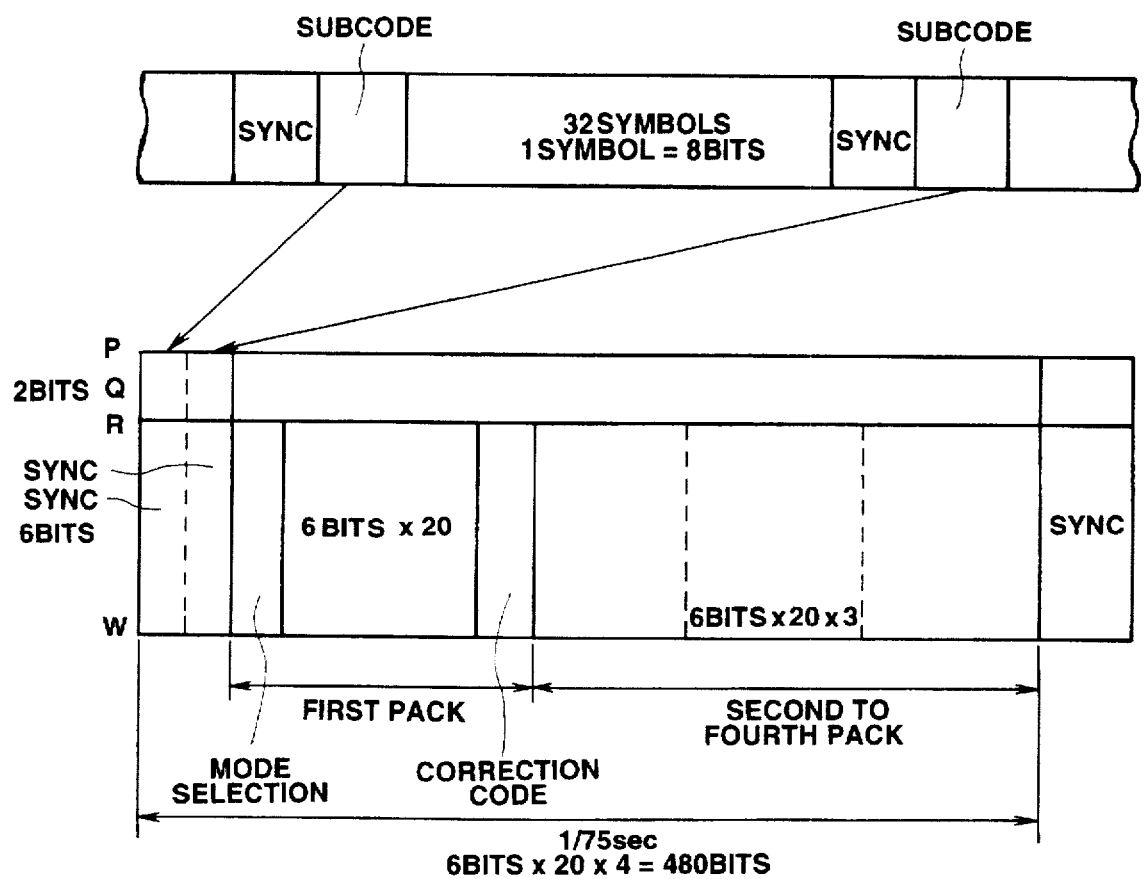
FIG. 16 illustrates a subcode structure.

That is, after the end of the above processing by the processing circuit 51 of the encoder apparatus, shown in FIG. 1, the audio data (music information) and the subcode information, which will be explained later by referring to FIG. 16, are supplied to a synchronization information and subcode information addition circuit 54, where the subcode information is added to the audio data information. The data having the pre-set format enters a modulation circuit 55 where it is modulated by EFM. Output data of the modulation circuit 55 is supplied to an optical head 56 which then radiates a laser beam corresponding to the input data to a disc 57 rotated by a spindle motor 58 at a pre-set speed. This records data on the disc 57.

The blocks reproduced with a word length exceeding 16 bits are recorded in two different recording portions. It is of great significance to maintain interchangeability with the conventional compact disc, that is to enable the compact disc recorded by the usual CD player in accordance with the present system to be reproducible without any troubles. To this end, that is for producing good playback sound even if only the MSB side 16 bits are reproduced by the usual CD player, that is if lower two bits of the 18 bits are not reproduced, the following two-stage SBM technique is employed.

Figure 15:
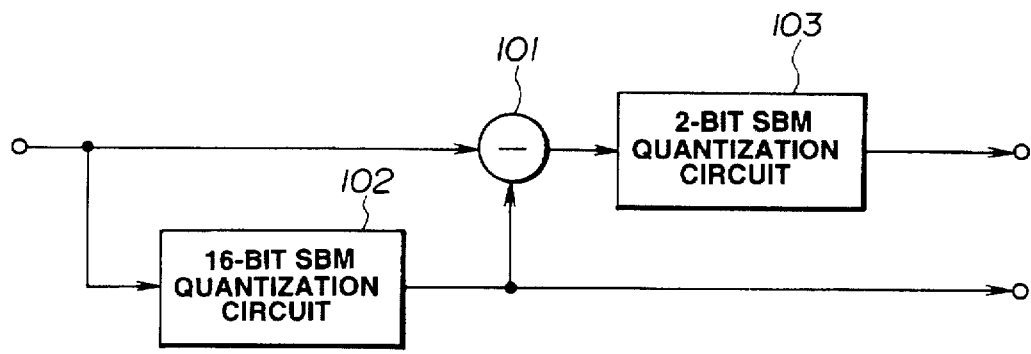
FIG. 15 is a block diagram showing an illustrative construction of a circuit for performing 2-stage SBM quantization.

This technique is explained by referring to FIG. 15. The quantization input word, having a 20-bit word length, is supplied to a subtractor 101 and a 16-bit SBM quantization circuit 102. The subtractor 101 calculates the difference between the input word itself and the output of the 16-bit SBM quantization circuit 102. The resulting difference is quantized by an SBM quantization circuit 103. The SBM quantization circuits 102, 103 are configured as shown in FIG. 10 and perform noise shaping in accordance with pre-set characteristics.

In this manner, the 16-bit SBM quantization circuit 102 performs 16-bit SBM quantization and the subtractor 101 produces a difference between data prior to the 16-bit SBM quantization and data posterior to 16-bit SBM quantization. This difference signal (quantization error) is quantized by the 2-bit SBM quantization circuit 103 with 2-bit SBM quantization. This produces a 16-bit SBM quantization signal (output of the 16-bit SBM quantization circuit 102) and a 2-bit SBM quantization signal (output of the 2-bit quantization circuit 103) which is appended to the 16-bit SBM quantization signal to produce a 18-bit SBM quantization signal.

By this encoding process for the second pass, the respective blocks are quantized by 14-bit SBM quantization, 16-bit SBM quantization and 18-bit SBM quantization. The 18-bit SBM quantization occurs by two-stage quantization, that is 16-bit SBM quantization and 2-bit SBM quantization.

Although the bit length used for bit debit/bit credit is limited to two bits, it may also be of various numbers of bits.

The quantized output from the second pass processing are rearrayed in accordance with the relation of address correspondence obtained by the first pass processing and are sent to the synchronization information and subcode information addition circuit 54 of FIG. 1.

FIG. 16 shows the subcode structure. A one-byte subcode is appended to a block of 32 symbols of the music information, with each symbol being made up of eight bits. 98 of the subcodes are collected to form a single subcode block. In this subcode block are four packs having a capacity of 120 bits. It is in this portion that the information on the sorts and the places of the bit surplus blocks and the bit deficit blocks are recorded.

Figure 17:
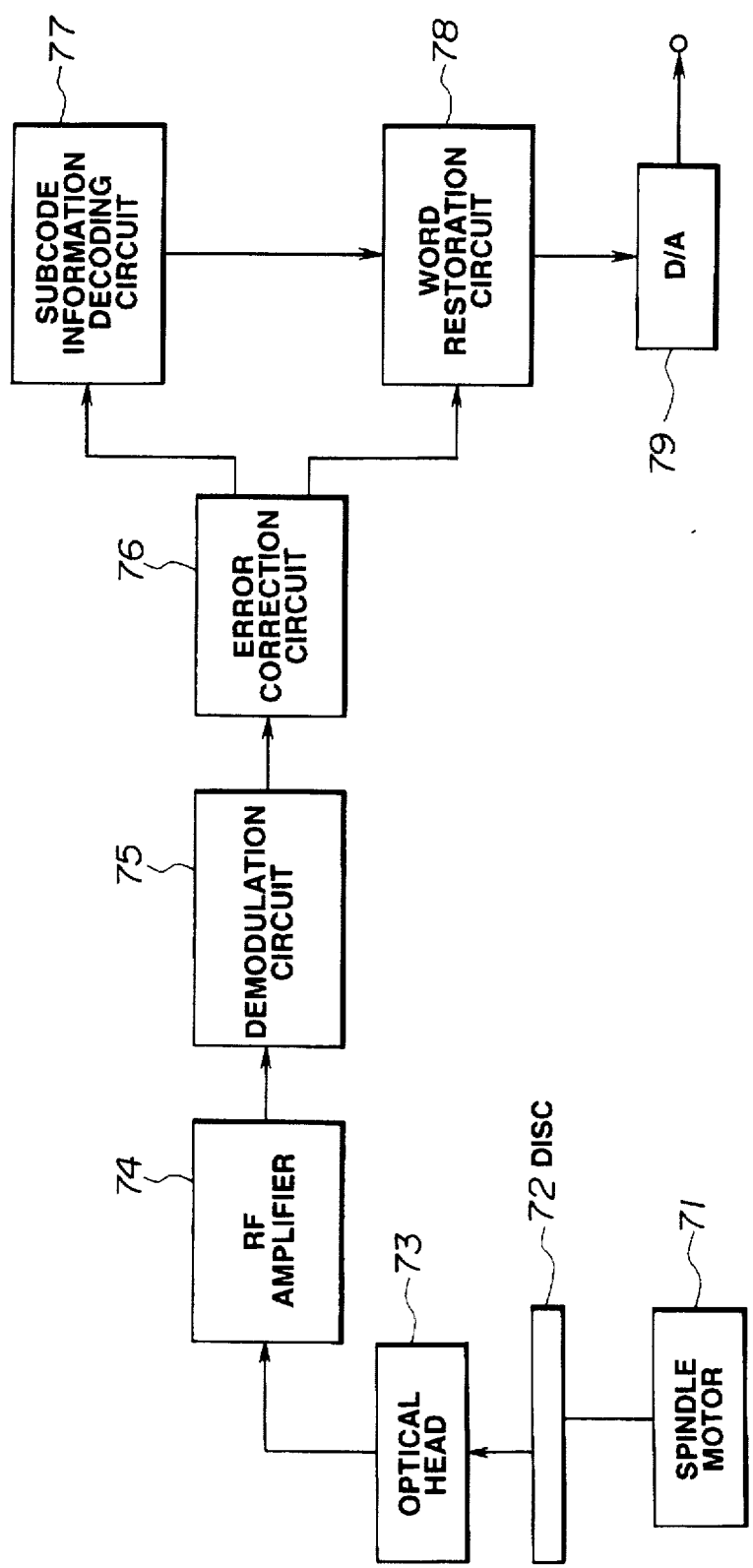
FIG. 17 is a block diagram showing an illustrative structure of a decoding device according to the present invention.

If the disc 57, thus recorded, is a master disc, a stamper is produced therefrom and a large quantity of discs (compact discs) as replicas are produced from the stamper. This compact disc is reproduced from a reproducing apparatus (CD player) shown in FIG. 17.

In the present embodiment, the disc (compact disc) 72 is designed to be rotated by a spindle motor 71 at a pre-set speed. An optical disc 73 radiates a laser beam to the disc 72. The information recorded on the disc 72 is reproduced from the laser beam reflected from the disc 72. The RF signals outputted by an optical head 73 are supplied to an RF amplifier 74 and thereby amplified so as to be supplied to a demodulation circuit 75 for demodulation by EFM. An output of the demodulation circuit 75 is supplied to an error correction circuit 76 for error correction.

Of the data corrected for errors by the error correction circuit 76, the subcode is supplied to a subcode information decoding circuit 77, while audio data is supplied to a word restoration circuit 78. The subcode information decoding circuit 77 outputs the decoded results to the word restoration circuit 78. The word restoration circuit 78 restores audio data depending on the results of decoding of the subcode supplied from the subcode information decoding circuit 77 and outputs the restored data via a D/A converter 79 to a speaker, not shown.

In operation, the EFM channel modulation signals, for example, are read out from the disc 72 to the RF amplifier 74. At this time, the data is read out at a speed eight times as fast as the realtime speed. This fast readout operation is explained by referring to FIG. 18.

Figure 18:
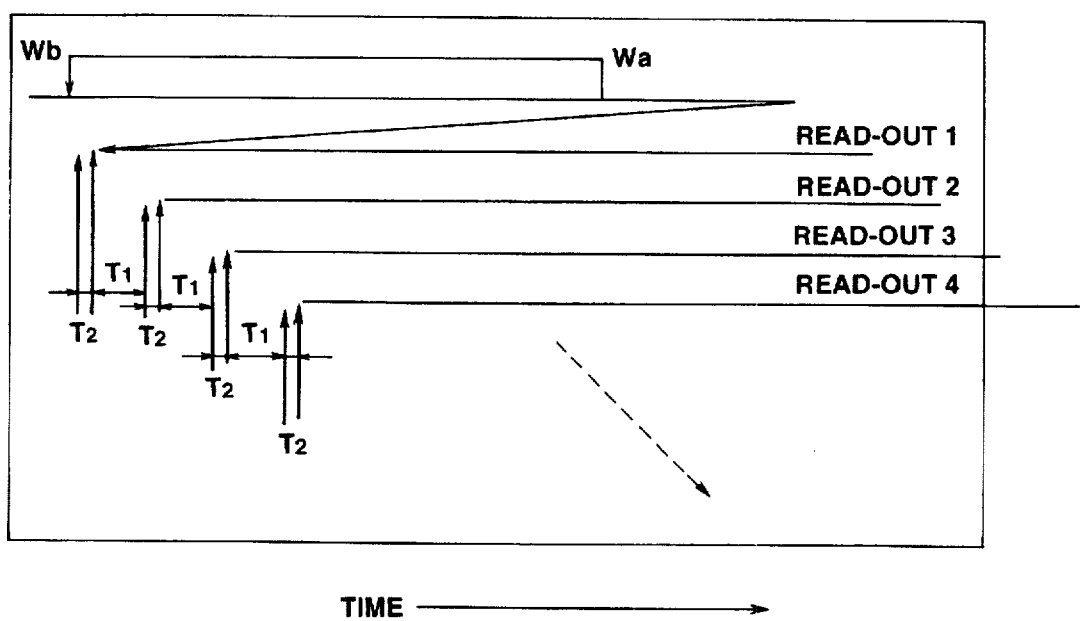
FIG. 18 illustrates high-speed pre-read technique.

In FIG. 18, a domain T1 denotes a domain in which the volume of the information eight times as much as the information volume read with the realtime speed is read. A domain T2 denotes a seek domain for the optical head 73. During domain T1, the information corresponding to readout time eight times as much as the readout time is read out. By repetition of the readout operations, the same information is reproduced repetitively eight times.

That is, if a pre-set domain has been read out by the first playback operation (readout 1), as shown in FIG. 18, the optical head 73 is jumped back for reproducing a new domain beginning at a position advanced by one-eighth from the start position of the reproduced domain and ending at a position advanced by one-eighth from the playback end point of the first domain (readout 2). After end of the playback for the new domain, the optical head 73 is again jumped back for similarly reproducing a third domain beginning at a position advanced by one-eighth from the start position of the reproduced new domain and ending at a position advanced by one-eighth from the playback end point of the new domain (readout 3).

The above-described playback operation is repeated sequentially.

This enables a precision improving signal written in a word Wa in a temporally future playback information portion to be used in a temporally past word Wb.

An output of the RF amplifier 74 is supplied to a demodulating circuit 75 for performing EFM demodulation of channel modulated signals. A demodulated output is supplied to an error correction circuit 76 for error correction. By the above processing, the 16-bit SBM quantized data, 14-bit SBM quantized data and the 2-bit SBM quantized data, processed during the recording process, as shown in FIGS. 13 and 14, are obtained on a memory enclosed in the word restoration circuit 78. The corresponding subcode information is obtained on an enclosed memory of the subcode information decoding circuit 77.

Figure 19:
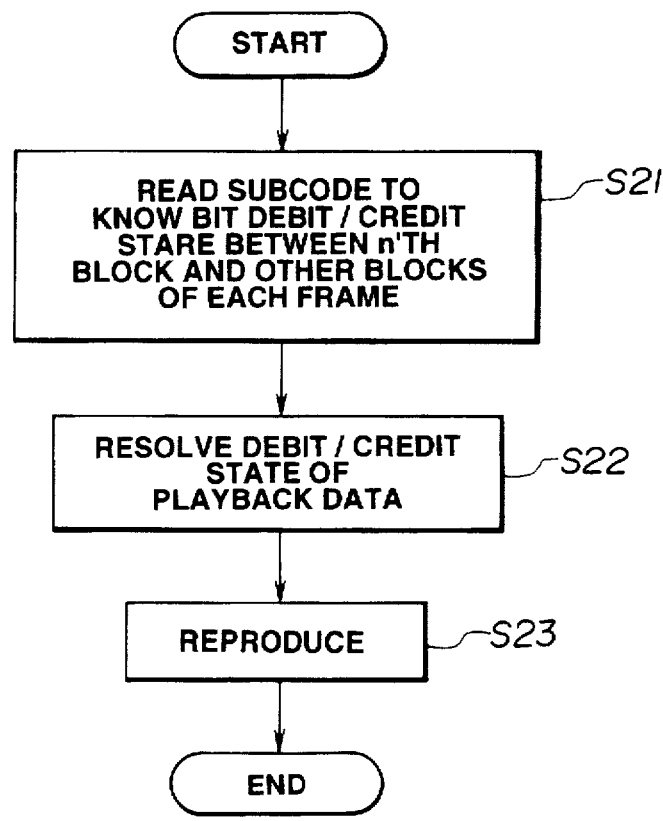
FIG. 19 is a flowchart for illustrating the operation of the embodiment of FIG. 17.

The subcode information decoding circuit 77 and the word restoration circuit 78 execute the processing shown in FIG. 19. First, the subcode information decoding circuit 77 reads out at step S21 the entered and stored subcode information and decodes the bit debit/bit credit states of the bit surplus blocks and the bit deficit blocks in the respective frames. The decoded results are supplied to the word restoration circuit 78.

Based on the bit debit/bit credit state information, supplied from the subcode information decoding circuit 77, the word restoration circuit 78 performs processing at step S22 for resolving the bit debit/bit credit states.

That is, the 16-bit SBM quantized data, to which should be appended the 2-bit SBM quantized data, is determined from the corresponding address written in the subcode. The 2-bit SBM quantized data is appended to the 16-bit SBM quantized data to complete the 18-bit SBM quantized data.

Figure 20:
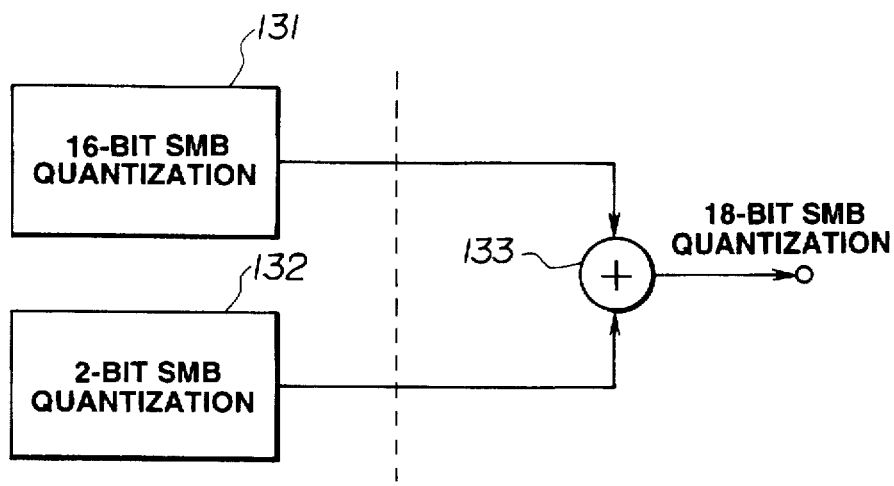
FIG. 20 illustrates the processing at step S22 of FIG. 19.

Referring to FIG. 20, showing the corresponding processing only schematically, the 16-bit SBM quantized data 131 and the corresponding 2-bit SBM quantized data 132, are summed at an adder 133 to output an 18-bit SBM quantized data.

If the 16-bit SBM quantized data, to which should be appended the 2-bit SBM quantized data, is not stored as yet on the memory, the 2-bit SBM quantized data is held until such data is supplied and stored.

Similarly, the unused 2-bit SBM quantized data is held until the corresponding 16-bit SBM quantized data is stored on the memory. The processing shown in FIG. 20 is executed when the corresponding data is available.

The 16-bit data of the bit surplus block, obtained on appending lower 2-bit data of another bit deficit block as lower two bits, are processed directly or after substitution of the lower two bits by data "00". Similarly, the 16-bit data of the block without bit surplus or bit deficit are processed directly.

The processing then transfers to step S23 of FIG. 19 for executing the playback operation. That is, data restored by the word processor 78 is supplied to the D/A converter 79 for D/A conversion and outputted at a speaker, not shown.

The above-described processing is repeated.

Considering that the disc 72 is reproduced on a usual CD player, it is always the words with the 16-bit word length that are reproduced. In such case, the 14-bit SBM processed words and the 16-bit SBM processed words are reproduced, and the 14-bit SBM processed words are lower in noise level than the allowable noise level, while the 16-bit SBM processed words are of the same sound quality as that of the usual 16-bit SBM processed CD, thus assuring interchangeability.

In this manner, the variable bit rate coding dependent upon the music contents may be introduced into the compact disc music system which is inherently of the fixed bit rate system. The result is that a required amount of bits may be allocated to a required time portion, thus enabling the sound quality to be improved.

In addition, the acoustic sound quality may be expected of the bit-stolen time portion by the masking effect, so that the encoding performance may be improved by variable bit rate coding.

In the above-described embodiment, there are arrayed, on the LSB side of a time domain, bits of a different time sample of a given time domain. It is however possible to array time-sample bits of different samples on the LSB side of the time domain.

According to the present invention, in which there is arrayed on the LSB side of a time sample a signal also having the precision-improving information of a time sample of a different time domain or a time sample of a different channel, the playback data may be improved in quality while the bit rate remains fixed.

Furthermore, the information on the signal portion with an acoustically inaudible signal level lower than the transmission feasible level is arrayed in the signal portion with an acoustically inaudible signal level higher than the transmission feasible level, the sound quality may be improved while the interchangability is maintained.

Although the present invention has been described with reference to the case of recording audio signals, it is to be noted that the present invention can be applied to the case of recording video signals or any other signals on a recording medium.

What is claimed is:

1. A method for transmission of digital data of a fixed word length, comprising the steps of:
   specifying unperceived LSB side bits in some time samples of the digital data; and
   writing the information of at least a portion of another time sample in substitution for the unperceived LSB side bits for providing the same word length of the entire time samples
   wherein the unperceived bits are acoustically unperceived bits and wherein the bit specifying step includes detecting a masking signal level derived from psychoacoustic characteristics of the digital data, specifying bits of a signal portion for which the masking signal level is higher than the transmission feasible level of the some time samples, and arraying and transmitting the information of a signal portion for which the masking signal level is lower than the transmission feasible level as the information of at least a portion of another time sample.

2. The method as claimed in claim 1 wherein said other time sample is a temporally previous time sample or a temporally posterior time sample of the same channel or a time sample of an other channel.

3. The method as claimed in claim 1 wherein said digital data is recorded on a compact disc and wherein the address information is recorded in a subcode of the compact disc.

4. The method as claimed in claim 3 wherein said address information is comprised of at least the address information for which the acoustically inaudible signal level is higher than the transmission feasible level and the address information for which the acoustically inaudible signal level is lower than the transmission feasible level.

5. The method as claimed in claim 1 wherein the digital data of the fixed word length is straight PCM code and wherein an acoustically audible LSB side portion lower in level than the transmission feasible level of another time sample is arrayed and transmitted in substitution for acoustically inaudible LSB side portion of a time sample of the straight PCM codes.

6. The method as claimed in claim 1 wherein the digital data of the fixed word length is straight PCM code and wherein partial data of compressed PCM codes of another time sample is arrayed and transmitted in substitution for an acoustically inaudible LSB side portion of a time sample of the straight PCM codes.

7. The method as claimed in claim 1 wherein the some time samples of the digital data are time samples from a quantizer having first noise shaping characteristics and wherein quantization errors thereof are quantized by a quantizer having second noise shaping characteristics and arrayed in substitution for the unperceived LSB side bits.

8. The method as claimed in claim 1 wherein said noise shaping characteristics are determined by acoustic characteristics within an audio range.

9. An apparatus for reproducing digital audio data from a recording medium on which plural fixed-length time samples are stored and these plural fixed-length time samples are interchanged for generating new time samples, wherein digital data written in the recording medium supplying the digital data to the reproducing apparatus are digital data processed by the steps of:

specifying unperceived LSB side bits in some time samples of the digital data; and writing the information of at least a portion of another time sample in substitution for the unperceived LSB side bits for providing the same word length of the entire time samples.

10. An apparatus for reproducing digital audio data from a recording medium on which plural fixed-length time samples are stored and these plural fixed-length time samples are interchanged for generating new time samples, wherein digital data written in the recording medium supplying the digital data to the reproducing apparatus are digital data processed by the steps of:

specifying unperceived LSB side bits of some time samples of the digital data; and writing the information of at least a portion of another time sample in substitution for the unperceived LSB side bits for providing the same word length of the entire time samples the apparatus comprising:
means for pre-reading information contained in a code portion having a posterior playback timing at a readout speed higher than realtime speed; and
means for appending to a code portion having a previous playback timing.

11. An apparatus for reproducing digital audio data from a recording medium on which plural fixed-length time samples are stored and these plural fixed-length time samples are interchanged for generating new time samples, wherein digital data written in the recording medium supplying the digital data to the reproducing apparatus are digital data processed by the steps of:

specifying unperceived LSB side bits some time samples of the digital data; and writing the information of at least a portion of another time sample in substitution for the unperceived LSB side bits for providing the same word length of the entire time samples the apparatus comprising:
means for pre-reading the information contained in a code portion having a previous playback timing and storing the readout information in a memory; and
means for appending to a code portion having a posterior playback timing.

12. A method of encoding an input audio data signal, including:

dividing the input audio data signal into blocks of frequency domain spectra and determining an allowable noise level on a block basis;

applying quantization noise reduction processing to the blocks of frequency domain spectra;

for each sampling block, identifying:
bit surplus blocks having a bit surplus whereby the allowable noise level for the block is higher than a quantization noise level that remains for the block after the quantization noise reduction; and
bit deficit blocks having a bit deficit whereby the allowable noise level for the block is lower than a quantization noise level that remains for the block after the quantization noise reduction;

adjusting surplus bits of the bit surplus blocks to the deficit bits of the bit deficit blocks to determine a quantization word length for each block; and performing the quantization noise reduction processing for each block in accordance with the quantization word length determined for that block to generate quantized blocks.

13. The method of claim 12, wherein the adjusting step adjusts surplus bits to deficit bits in temporally order.

14. The method of claim 12, wherein for bit deficit blocks, the deficit bits are identified as least significant bits of the bit deficit blocks.

15. The method of claim 12, and further comprising:
recording the quantized blocks onto a recordable medium; and
also recording, onto the recordable medium, address information indicating the bit surplus blocks and the bit deficit blocks.

* * * * *